July 13, 1965   G. G. RUMBERGER   3,194,469
FOLDING CARTONS CONSTRUCTED OF PARTICULAR
LAMINATED SHEET MATERIALS
Filed Aug. 23, 1961

THICKNESS OF 14 EXCEEDS .8 THE
THICKNESS OF THE THICKEST OF
12 AND 13.

INVENTOR.
GEORGE G. RUMBERGER
BY
ATTORNEY

United States Patent Office 3,194,469
Patented July 13, 1965

3,194,469
FOLDING CARTONS CONSTRUCTED OF PARTICULAR LAMINATED SHEET MATERIALS
George G. Rumberger, Portage, Mich., assignor to KVP Sutherland Paper Company, Kalamazoo, Mich., a corporation of Delaware
Filed Aug. 23, 1961, Ser. No. 133,521
6 Claims. (Cl. 229—3.1)

The present invention relates to new and improved laminated sheet materials which are particularly useful for packaging purposes, and is more particularly concerned with such types of new and improved laminated sheet materials, especially fibrous sheet materials, which can be cut, scored, and folded by usual means to form carton blanks and corresponding cartons affording a high order of protection for the contents thereof. The invention moreover relates to combinations of moisture-vapor-proof adhesives with base sheets which maintain their original moisture-vapor-proofness even when scored and die cut and formed into cartons.

For the packaging of materials which are susceptible to moisture gain or loss, it is desirable to have packages which afford complete protection of the contents by prohibition of moisture-vapor and gas transfer through the package. This is equally desirable whether the materials to be packaged are powders, gels, flakes, or liquids in the frozen or unfrozen state. Notable among products which may suffer from gain or loss of moisture are dehydrated foods, frozen foods, dry sugared and unsugared cereals, baked goods, chemicals, vegetables, and the like.

In the past, attempts have been made to package such materials in cartons which have been waxed or fabricated of laminated materials, such as paperboard wax-laminated to paper. In spite of the fact that some of these materials show a low rate of moisture-vapor or gas transfer when tested as unscored and unfolded sheets, they have failed to protect materials packaged therein when they are cut, scored, folded and formed into closed cartons. Even when metal, e.g., aluminum, foil is laminated to paperboard with wax and the laminate formed into cartons, the protection which might be expected of this combination of sheet materials has not been attained. For this reason it has been necessary to overwrap such cartons with highly protective papers and combinations of foils and/or films, or to inner-wrap the contents. It would obviously be highly desirable to be able to package highly hygroscopic, efflorescent, or deliquescent materials in cartons alone, thus gaining a considerable advantage in packaging speed and cost.

It is accordingly an object of the present invention to provide a new and improved laminated sheet material and a method for the production thereof, which sheet material exhibits an extremely low rate of moisture-vapor or gas transfer both in the form of unscored and unfolded sheets and in the form of cut and scored carton blanks and cartons produced therefrom. An additional object is the provision of carton blanks and cartons of such laminated sheet material. Other objects of the invention will be apparent to one skilled in the art and still other objects will become apparent hereinafter.

It has now been found that one extremely important cause of the breakdown in protection of cartons as aforesaid is due to limitations of the materials of their construction when subjected to cutting and scoring and subsequent folding operations to produce an erected and closed carton. Moreover, I have found that critical dimensional factors reside in the thicknesses of the various components or plies of laminated sheets which, when properly controlled, result in laminated sheet materials suitable for carton blank and carton constructions and which can be cut, scored and folded to produce cartons having excellent protective properties.

I have found that by the time carton-forming materials of the prior art have been formed into cartons by usual procedure and means, a breakdown of the barrier materials of their construction has already resulted, whether the barrier material is the laminating adhesive material or one of the sheet materials itself, or both. Such breakdown results in pore type permeation, which is highly vapor pressure dependent, and consequently a high rate of gas and water-vapor exchange between the inside and outside of the package results. Surprisingly, I have found that at times this exchange greatly exceeds transpiration through the closures and sidewalls of the package.

I have, however, also found, a solution to this problem, which involves selective control of the thickness ratios of the laminant used for the sheet construction to the sheet materials laminated together therewith. Briefly, I have found that when two sheet materials are laminated together with a water-vapor-proof adhesive, the ratio of the thickness of the adhesive to the thickness of the thickest coherent sheet material contacting the laminant should exceed eight-tenths to one and preferably exceed one to one in order to produce a laminated sheet stock which can withstand cutting, scoring, folding and forming involved in production of cartons without undue loss of protective properties. I have found that further improvements in protectiveness of the laminated sheet material constituting the carton stock can be effected if the thickness of laminant is increased up to, say, a two to one or greater ratio to the thickness of the thickest coherent ply of the sheet material contacting the laminant, but such further improvements are less dramatic than at around the eight-tenths to one critical point mentioned heretofore, and appear to result from improvements in solution type permeation rather than pinhole type permeation.

By a "coherent" sheet or ply, as used herein, I mean a sheet or ply which maintains its identity as a continuous and integral member during scoring and folding. Most plastic films exhibit this property. Paper sheets made on a Fourdrinier machine exhibit this property as they are made from a single homogeneous furnish. On the other hand, paper, and especially paperboard, made on a cylinder machine or multiple headbox Fourdrinier machine may have a number of plies, and these plies usually act as individual sheets during scoring and folding inasmuch as their internal strength allows them to separate from each other at least to a certain extent when placed under compression during scoring and folding. Thus, the ratios of laminant thickness to sheet or ply thickness stated above apply only to the thickest of the homogeneous separable plies of such paper or paperboard bonded to another sheet material by the laminating agent when multi-ply paperboards or papers made on such machines are under consideration. The same considerations apply to multi-ply sheet materials which are glued or otherwise bonded to each other, namely, if they act as a single sheet, then the thickness ratio applies to the whole sheet material as an entity, but if they separate into individual sheets or plies upon scoring or folding, as do the cylinder board or multiple headbox Fourdrinier papers or boards, rather than maintaining their integrity, then the thickness ratio applies to the thickest of the plies contacting the laminant. Whether or not a sheet is a "coherent" sheet is readily determined by crease scoring and folding the sheet 180 degrees and then unfolding the sheet 90 degrees and observing whether separation into individual sheets or plies occurs. If it does not, then it is a "coherent" sheet; if it does than the thickest non-separating ply or sheet contacting the laminant is the one of interest from the standpoint of the thickness ratio.

In addition to the improvements in protective properties imparted to the final package thereby, my improved sheet material has other valuable characteristics. Whereas ordinary laminated sheets have a high direction orientation, as indicated by a ratio of machine-direction to cross-machine-direction stiffness often exceeding 2.5:1, the improved sheet materials described herein have a low stiffness ratio, MD/CMD (i.e., machine direction/cross machine direction), generally not exceeding 2:1 and often approaching 1.2:1. This is of considerable value in the provision of constructional features, such as in the provision of cartons having nearly equal resistance to folding whether scored with or across the grain, or on a bias to the grain. This similarity is of value in making optimum use of the sheet materials in cutting and creasing, and also in the performance of automatic packaging machinery. In addition, there is very little springback when scored lines of my laminated sheet materials are folded.

In the drawings—

Figure 2:
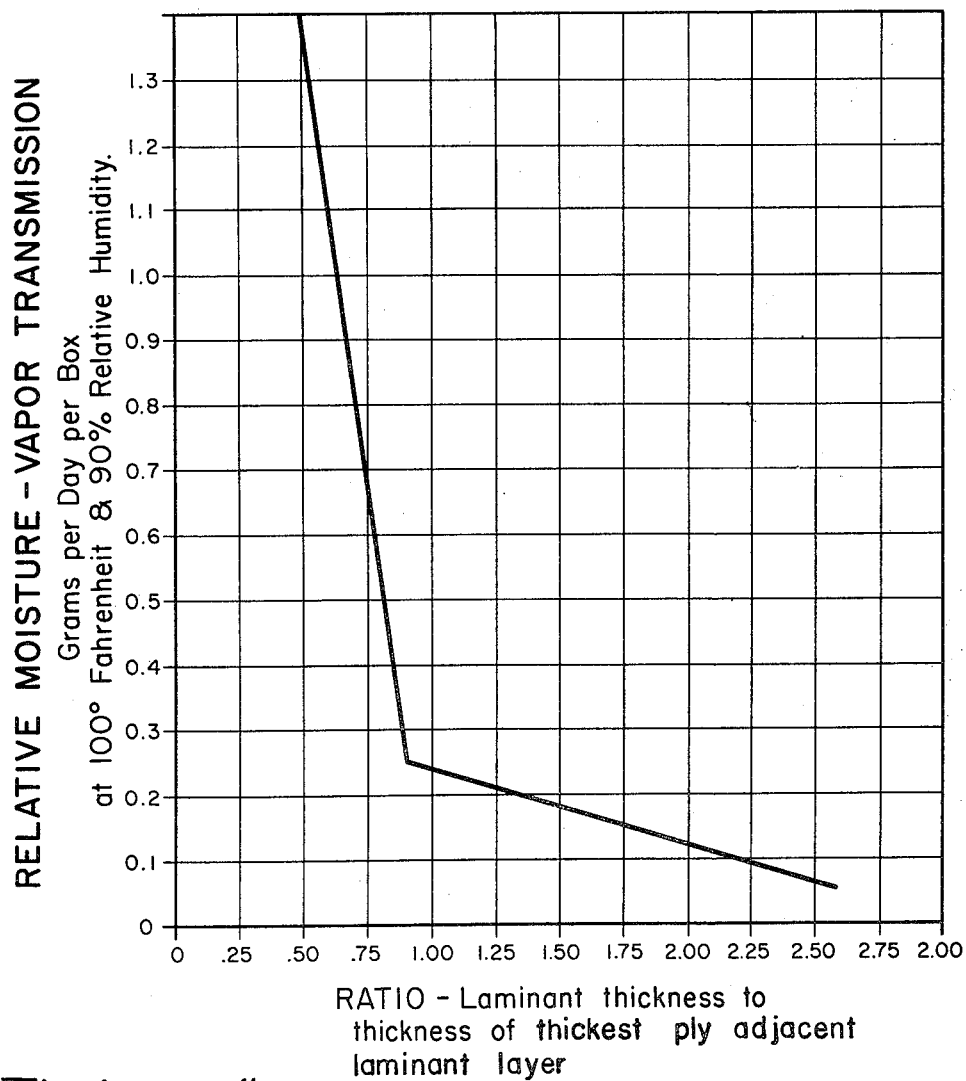
FIG. 2 is a graph showing the effect of the ratio of laminant thickness to the thickness of the thickest coherent ply of sheet material upon the relative moisture vapor transmission of an erected and sealed folding carton.

I prefer to use hot-melt adhesives in uniting the plies of my laminated carton stock. Moisture-vapor-proof hot melts based on hydrocarbon and ordinarily petroleum waxes are preferable, as these have a high degree of plasticity and flexibility. Hot melts based on microcrystalline wax are especially preferred. Additional representative laminant adhesives include (A) microcrystalline waxes of any origin, e.g., Louisiana, Pennsylvania or Mid-Continent origin (preferably of a melting point of about 130° F. to about 200° F., a needle penetration value of about 10 to 60, and a refractive index at 210° F. of from about 1.4325 to about 1.4450 for the sodium D line), and/or paraffin waxes (preferably of a melting point of about 110° F. to about 170° F. and a viscosity at 210° F. of less than about 8.0 centistokes), modified with: (1) synthetic polymers such as butyl rubber, polyisobutylene, polyethylene, copolymers of vinyl acetate and ethylene, (2) aluminum stearate; (3) hydrophilic adsorbents, (4) surfactants, (5) terpene resins, (6) ester gums, (7) rosin derivatives, and the like; (B) low molecular weight polymers such as (1) polystyrene of 4,000 to 20,000 M.W., (2) polyethylene of 2,000 to 12,000 M.W., (3) polyterpenes, (4) isoprene polymers, (5) chlorinated natural and synthetic rubbers, (6) natural rubbers, and the like; (C) cellulose derivatives such as (1) ethyl cellulose compositions and mixtures thereof with resins, waxes and plasticizers, (2) nitrocellulose thermoplastics, (3) cellulose acetates or other esters and mixtures thereof with resins and the like. Adhesives based on petroleum waxes, especially microcrystalline waxes, containing gelling agents and essentially neutral surface activators are suitable, especially such as contain a hydrous adsorbent and a surface activator as exemplified by Example 2 hereof and as more fully described in my copending patent application Serial No. 133,490, filed August 23, 1961. Such wax compositions have desirable viscosities and thixotropic characteristics. Suitable hydrous mineral adsorbents for such use are attapulgite, hectorite, illite, fuller's earth, saponite, bauxite, and porous montmorillonite clays. Synthetic or chemically regenerated minerals, such as hydrated alumina, hydrated magnesium aluminum silicate, hydrated silica gel and hydrated porous zeolites may also be used. Suitable surface activators (also known variously as surface active agents, wetting agents, emulsifiers, and the like) are preferably nitrogen derivatives but are not limited thereto, and are characterized by having at least one aliphatic, preferably paraffinic, chain of at least eight and preferably ten to thirty, or even more, carbon atoms. Fatty acid amides and alkyl quaternary ammonium salts are preferred; others which may be mentioned are amine salts and soaps, alkyl-substituted ureas, alkyl-substituted pyridinium salts, and the like. Amides produced from fatty acids of natural animal or vegetable origin are of particular adaptability, such as those derived from tallow, cocoanut oil, castor oil, and the like, with or without hydrogenation. The hydrous adsorbent and the surface activator are preferably admixed with the melted wax or wax composition and maintained at an elevated temperature, e.g., about 220 to 400 degrees Fahrenheit, while subjecting the mixture to agitation with a high-shear mixer, to cause expulsion of the water of hydration present in the hydrated adsorbent. The resulting wax compositions have suitable viscosities and thixotropic properties, and are especially suited for use as thermoplastic adhesive laminants.

In order to apply the amounts of laminating adhesive required in carrying out the present invention, it is necessary to control the viscosity of the laminating agent. Control of viscosity is also useful in preventing excessive penetration of the laminant into the sheet material, and in the control of squeeze-out from the edges of the sheet. In general, I have found that the viscosity of the laminating hot melt must exceed 75 centipoises at the laminating temperature as determined by a Brookfield Synchro-electric Viscometer or other rotational viscometer at a spindle speed of less than ten r.p.m. Viscosities in excess of 150 centipoises are preferred. Suitable laminations have been obtained with laminating hot melt adhesvies having viscosities in excess of five million centipoises.

As already stated, I may use a variety of viscosity building agents when using petroleum wax as a base. Table I lists some materials which are particularly suitable for this use. Hydrocarbon polymers represent a preferred class, and colloidal silica and butyl rubber are also preferred viscosity builders from among those mentioned.

TABLE I

Polyisobutylene
Polyethylene
Polypropylene
Cholorinated rubber
Metal stearates
Polyterpenes
Natural rubber
Butyl rubber
Colloidal silica
Amine and otherwise treated bentonites
Adsorbent clays
Ethylene=vinyl acetate copolymers
Ethylene=isopropyl alcohol telomers The petroleum waxes used in the adhesives are usually, but not necessarily, the microcrystalline waxes. These may be diluted and extended with paraffin or the so-called intermediate or motor oil waxes described in the literature. I find that up to eighty percent of the microcrystalline wax in the adhesive can be replaced by paraffin or intermediate wax when using certain base sheets.

Instead of microcrystalline wax compositons, I may for example use other thermoplastic moisture-vapor-proof hydrocarbon laminants including low molecular weight polyethylenes, for example those having a molecular weight of about 2,000 to 7,000 (such as DYDT of 4,000 molecular weight, or DYGT of 7,000 molecular weight, both made by the Bakelite Division of Union Carbide Corporation), or branched polyethylenes having a molecular weight of about 2,000–5,000 (such as Epolene C, made by Eastman Chemical Products, Inc.).

The sheet materials used in my invention will, in general, be fibrous cellulosic or synthetic sheets, but in some cases foils or films may be used as one ply. I have found that aluminum foil may be advantageously used for one ply, especially when it is to become the inside surface of a carton. The aluminum foil may be and preferably is mounted on a light paper before laminating as herein described, and is preferably contiguous to the laminating adhesive.

It has been necessary to devise new methods of testing to measure the properties of a final carton, since tests on flat sheets do not take into account the mechanical damage encountered in carton fabrication and use. The following test procedure has been devised and employed in testing the laminated sheet material and carton stocks of the invention:

Carton blanks having full glue flaps are cut and scored on a press to give cartons which, when erected and glued, measure 5½ inches high by three inches wide by 1⅝ inches deep. The carton blanks are folded with two score lines folded through 180 degrees, and the side seam glued with polyvinylacetate-base adhesive. The carton is then erected and the bottom flaps glued shut with polyvinylacetate-base adhesive. Fifty cubic centimeters of anhydrous calcium chloride is placed in each of the cartons and the top flaps glued shut. The cartons will each have had the following treatment at the vertical score lines: two scores folded through 180 degrees, then unfolded to 90 degrees; two scores folded through 90 degrees. Representative cartons of each batch are tested as sealed by the glue closure of the flaps only. Ends of representative cartons of each batch are also dipped in wax to wax seal the end glue flaps only. All cartons are placed in various climatic conditions and the rate of weight gain measured by periodic weighings.

The following examples illustrate the advantage of controlling the thickness ratios in obtaining a high order of protection in cartons. These examples are given by way of illustration only and are not to be construed as limiting. All ream weights given are on a basis of a 24-inch x 36-inch x 500-sheet count.

*Example 1*

A laminating adhesive consisting of 3.6% butyl rubber and 96.4% laminating grade microcrystalline wax, M.P. 155–165° F., of Mid-Continent derivation (Ceretak, Bareco Wax Division, Petrolite Corporation) was made up by dissolving the butyl rubber in the wax at about 250° F. This laminating adhesive was used to adhere the following pairs of stocks together: (1) 0.0035" coated Fourdrinier book paper weighing 59 lbs. per ream to 0.0035" dry waxed Fourdrinier paper weighing 50 lbs. per ream with 0.006" (90 lbs. per ream) of laminating adhesive; (2) 0.012" coated Fourdrinier board weighing 162 lbs. per ream to 0.0035" dry waxed Fourdrinier paper weighing 50 lbs. per ream with 0.0065" of laminating adhesive weighing 95 lbs. per ream; (3) 0.0035" dry waxed Fourdrinier paper to itself with .007" of laminating adhesive weighing 95 lbs. per ream. Test cartons were fabricated from these stocks, and tested for rate of weight gain as shown in the following Table II:

TABLE II

WEIGHT GAIN—GRAMS/DAY/BOX, 50 CC. ANHYDROUS CaCl₂ IN EACH BOX

| Stock | Stored at 50% R.H. @ 73° F. | | Stored at 90% R.H. @ 100° F. | |
|---|---|---|---|---|
| | Ends glued and wax dipped | Ends glued only | Ends glued and wax dipped | Ends glued only |
| (1) | .055 | .057 | .270 | .300 |
| (2) | .113 | .163 | .600 | .820 |
| (3) | .003 | .047 | .033 | .270 |

The foregoing Table II shows that by controlling the relationship of sheet and laminant thickness within the ranges hereinbefore described, superior protective qualities can be obtained. This is shown by comparing (1) and (3), which are in accord with the present invention, with (2), which is not.

*Example 2*

A laminating adhesive was made up as follows: to 85 parts of laminating grade microcrystalline wax, M.P. 155–165° F., of Mid-Continent origin, heated to 250° F. was added 1.66 parts of hydrogenated tallow amides [containing 22% hexadecanamide, 75% octadecanamide, and three percent octadecanamide (Armid HT)] and the mixture stirred slowly until a complete solution was obtained. Then 13.33 parts of powdered attapulgite [having a particle size between .02 and two microns, an average particle size of about .14 micron, and a seventeen percent moisture content (Attagel 20)] was added slowly while stirring to prevent excessive foaming. When the powdered attapulgite had been dispersed and foaming ceased, the mixture was transferred to a high-shear mixer of the Waring Blendor type, and mixed under high shear until viscosity of a thixotropic nature had built up. When the viscosity had reached 250 cps. at 250° F., as measured by a Brookfield Synchroelectric Viscometer, the adhesive was transferred to a laminator and the following combinations of sheets laminated together: (4) 0.0035" dry waxed Fourdrinier sulfite to itself using 0.0060" laminating adhesive, (5) 0.0035" dry waxed Fourdrinier sulfite to 0.014" solid news cylinder board having a high ply bond strength and weighing 195 lbs. per ream using 0.0065" of laminating adhesive weighing 110 lbs. per ream. Test cartons were fabricated and tested for water-vapor-proofness with the results shown in the following Table III:

TABLE III

WEIGHT GAIN—GRAMS/DAY/BOX, 50 CC. ANHYDROUS CaCl₂ IN EACH BOX

| Stock | Stored at 50% R.H. @ 73° F. | | Stored at 90% R.H. @ 100° F. | |
|---|---|---|---|---|
| | Ends glued and wax dipped | Ends glued only | Ends glued and wax dipped | Ends glued only |
| (4) | .010 | .055 | .100 | .260 |
| (5) | .100 | .150 | .570 | .830 |

The foregoing table again shows that, with equivalent thicknesses of laminant or less, far better results are obtained when the thickness of neither of the sheet materials exceeds the thickness of the moisture-vapor-proof laminating adhesive.

*Example 3*

A laminating mixture was made up consisting of five parts of distearyl aluminum hydroxide (Di Acid Aluminum Stearate-Mallinckrodt), three parts of the glycerol ester of hydrogenated rosin (Staybelite Ester 10-Hercules Powder) and 92 parts of laminating grade microcrystalline wax (Bareco-Ceratak). This adhesive had a viscosity of 3,100 centipoises and was thixotropic. It was used to laminate (6) 0.0035" coated book paper to 0.0035" dry waxed sulfite using 0.007" of laminating adhesive and (7) 0.0012" coated Fourdrinier board to 0.0035" dry waxed Fourdrinier sulfite using 0.0075" of laminant. These sheets compare in protective properties as follows when tested as cartons:

TABLE IV

WEIGHT GAIN—GRAMS/DAY/BOX, 50 CC. ANHYDROUS CaCl₂ IN EACH BOX

| Stock | Stored at 50% R.H. @ 73° F. | | Stored at 90% R.H. @ 100° F. | |
|---|---|---|---|---|
| | Ends glued and wax dipped | Ends glued only | Ends glued and wax dipped | Ends glued only |
| (6) | .037 | .062 | .170 | .530 |
| (7) | .163 | .175 | .900 | 1.300 |

A comparison of the foregoing results shows that even though the type of laminant may have a certain effect on the result obtained, the thickness relationship between the sheet materials and the adhesive laminant has a far greater effect on the protection obtained when laminated structures are formed into cartons.

The following example shows more clearly the importance of the relationship of the adhesive to sheet material thickness.

*Example 4*

Using the laminating agent of Example 2, 0.0035" thick coated Fourdrinier book paper weighing 59 lbs. per ream was laminated to 0.0035" dry waxed Fourdrinier sulfite paper weighing fifty lbs. per ream using varying amounts of laminant in thickness ranging from 0.0005" to approximately 0.01". The stocks obtained were tested by forming into cartons, introducing anhydrous calcium chloride, wax sealing the end flaps, and subjecting to ninety percent relative humidity and 100° F. to determine weight gain. It was found that there was a sharp increase in rate of weight gain when the thickness of the laminant was less than 0.003", while above this thickness there was a gradual decrease in rate of weight gain. These results are apparent from an inspection of FIGURE 2, which is a graphic depiction of the results in terms of thickness of intercalated laminant in relation to thickness of the thickest base sheet material, said thickness being taken at an unscored cross-section of the laminated sheet. The laminating wax used in this example weighed approximately fifteen lbs. per ream per each .001" thickness. From the graph of FIGURE 2, it is apparent that the critical ratio is a thickness ratio of intercalated laminant to heaviest sheet of approximately eight to ten.

*Example 5*

Combinations of sheet materials as shown in Examples 1 and 2 were made up using as adhesives (1) a colloidal silica (3 parts) in laminating grade microcrystalline wax, M.P. 155–165° F. (97 parts), and (2) 7.5 parts of alkyl ammonium montmorillonite clay (Bentone 38) in laminating grade microcrystalline wax, M.P. 155–165° F. (92.5 parts). Comparative tests in all cases showed that superior protective properties were obtained in cartons fabricated from stocks wherein the thickness of the laminant equalled or exceeded the thickness of the heaviest sheet material used in the combination.

*Example 6*

The laminant of Example 2 was made up except that Pennsylvania grade microcrystalline wax, M.P. 150–160° F. (Quaker State L-500) was substituted for the microcrystalline wax of Example 2. This laminant was used to laminate (81) 0.0035" coated book paper to 0.0035" dry waxed sulfite and (82) 0.0120" coated Fourdrinier board to 0.0035" dry waxed sulfite. Thickness of the wax was .0080" in both cases. After scoring and forming into cartons, filling with fifty cc. of anhydrous $CaCl_2$, and gluing and wax dipping the ends, weight gain rates were .006 gram per day per box for combination 81, and .118 for combination 82.

Through a systematic investigation of the reasons for the failure of scored and folded cartons wherein the thickness of one or more of the coherent sheets laminated together exceeds the thickness of the moisture-vapor-proof laminating adhesive, I have been able to reach conclusions relative to the limitations of the thickness of the component layers. Microscopic examination and dye-stain tests have shown that scoring of the carton wall made from such laminations does not greatly damage the adhesive layer, but subsequent folding and unfolding of the scored areas results in breaks in the adhesive with resulting pinhole-type permeation. When the layer of vapor-proof adhesive is sufficiently thick in relation to the coherent sheet materials laminated together, no breaks, and consequently no pinhole permeation results, and protective properties substantially improve. The said sufficient thickness of the laminating adhesive should exceed eight-tenths times the thickness of the heaviest coherent sheet material in the combination for these advantages to accrue.

The present invention may be practiced by employing thicknesses of sheet materials and laminant within the following generally illustrative ranges:

(1) Thickness of coherent sheet materials _____ .002" to .012"
(2) Thickness of laminant _____ .003" to .015"

For structural reasons, the total lamination will usually range in thickness from about .008" to about .03", and the adhesive laminants used will ordinarily have a density of from about twelve to about 25 lbs. per ream (24 x 36 x 500) per .001" thickness.

Figure 1:
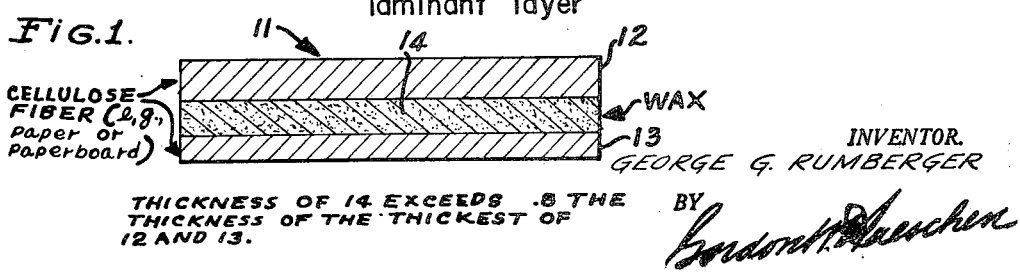
FIG. 1 is a cross-sectional view of the laminated sheet material which is used in the cartons of the invention.

FIGURE 1 shows, in exaggerated scale, a cross-section taken at an unscored area through a completed laminated sheet according to the invention, said laminated sheet being identified as 11. One ply of fibrous sheet material 12 is shown adhered to a second ply of fibrous sheet material 13 by moisture-proof thermoplastic laminating agent 14. The laminating agent in this case is wax. The ratio of the thickness of the laminating agent layer to the thickness of the thickest coherent ply of sheet material is in excess of 8 to 10, and the total thickness of the laminated sheet material 11 is about .008 inch to about .03 inch.

It is to be understood that either or all of the sheet materials may be treated in various ways before laminating, such as by printing, treating for greaseproofness or wax hold-out, glossing, and the like.

The novel laminated sheet materials of the invention may be cut into carton blanks and/or scored by any of the currently known scoring methods, such as impression scores, cut scores, combination scores, and by any method employing male and female dies, and folded and erected into cartons of any type.

Instead of gluing and/or wax dipping the end or side closures of cartons constructed from the novel sheet material stocks described herein, they may be heat-sealed as disclosed in my copending patent application Serial No. 133,439, filed August 23, 1961.

Although laminated stocks, wherein the thickness of the thermoplastic laminating material is less than eight-tenths times the thickness of the thickest individual coherent ply, are not intended as a part of the present invention, procedure for the special treatment of cartons, including cartons made from such stocks, to improve the protective properties thereof has been found, as disclosed in my copending application Serial No. 133,491, filed August 23, 1961.

It is to be understood that the invention is not limited to the exact details of operation or the exact compounds or compositions shown and described, as obvious modifications and equivalents will be apparent to one skilled in the art, wherefore the invention is to be limited only by the scope of the appended claims.

I claim:

1. A folding carton having end closure flaps hingedly attached to panels formed from a scored blank, said folding carton being produced by steps which comprise folding said blank at two scores through about 180 degrees to permit side-seaming for production of a tubular carton body and being adapted to be converted into a sealed carton having highly protective properties by steps which include unfolding at said two scores about 90 degrees to form a body of rectangular cross section, and folding and sealing together the end closure flaps thereof, said carton panels and end closure flaps being constructed of laminated sheet material having at least two coherent plies, each of said plies comprising at least one member of the group consisting of paper and paperboard, laminated together by a thermoplastic hydrocarbon wax-base adhesive, said laminated sheet material having an over-all thickness of at least .008 inch and said thermoplastic adhesive having a thickness of at least eight tenths the thickness of the thickest coherent ply adhesively united thereby.

2. A carton of claim 1 wherein the adhesive exceeds .003 inch in thickness and the over-all thickness of the laminated sheet material is about .008 inch to .03 inch.

3. A carton of claim 1 wherein aluminum foil is bonded to one of the plies.

4. A carton of claim 1 wherein the adhesive comprises microcrystalline wax containing a viscosity building agent.

5. A carton of claim 1 wherein one of the coherent plies united by the adhesive is a separable ply of a multi-ply paperboard.

6. A protective carton erected from a folding carton of claim 1, filled, and having its end closure flaps sealed shut.

References Cited by the Examiner

UNITED STATES PATENTS

| | | | |
|---|---|---|---|
| 1,965,719 | 7/34 | Nelson | 156—324 |
| 1,986,954 | 1/35 | Abrams et al. | 161—229 |
| 2,031,035 | 2/36 | Dreymann | 156—324 |
| 2,031,036 | 2/36 | Dreymann | 161—235 |
| 2,296,171 | 9/42 | Magill | 156—324 |
| 2,348,687 | 5/44 | Abrams et al. | 161—235 XR |
| 2,500,427 | 3/50 | Moose | 161—235 XR |
| 2,714,952 | 8/55 | Ireton | 161—235 |
| 2,975,094 | 3/61 | Anderson | 161—235 |
| 3,049,429 | 8/62 | Couch | 161—235 |

OTHER REFERENCES

Reprint R–1, "Waxes for Converting," Peacock Business Press, Inc., 200 S. Prospect Ave., Parkridge, Ill.

ALEXANDER WYMAN, *Primary Examiner*.

RICHARD D. NEVIUS, *Examiner*.

UNITED STATES PATENT OFFICE
CERTIFICATE OF CORRECTION

Patent No. 3,194,469                            July 13, 1965

George G. Rumberger

It is hereby certified that error appears in the above numbered patent requiring correction and that the said Letters Patent should read as corrected below.

Column 6, line 59, for "0.0012″ " read -- 0.012″ --; column 7, line 8, after "adhesive" insert -- thickness --.

Signed and sealed this 29th day of March 1966.

(SEAL)
Attest:

ERNEST W. SWIDER                          EDWARD J. BRENNER
Attesting Officer                             Commissioner of Patents